United States Patent [19]

Riley et al.

[11] 4,419,259

[45] Dec. 6, 1983

[54] DEGREASING AND DEOXIDIZING ALUMINUM FOIL

[75] Inventors: Donald J. Riley, Cliffside Park, N.J.; John W. Scott, Clinton, Tenn.

[73] Assignee: Sprague Electric Company, North Adams, Mass.

[21] Appl. No.: 313,874

[22] Filed: Oct. 22, 1981

[51] Int. Cl.³ .................. C11D 7/08; C23G 1/02
[52] U.S. Cl. .................... 252/142; 252/136; 252/79.2; 252/79.4; 252/174.21; 252/174.22; 252/DIG. 1; 134/3; 134/40; 134/41; 148/6.15 R
[58] Field of Search ............ 252/142, 136, 79.2, 252/79.4, 174.21, 174.22, DIG. 1, 173; 134/40, 41, 3; 148/6.15 R

[56] References Cited

U.S. PATENT DOCUMENTS

| | | | |
|---|---|---|---|
| Re. 27,662 | 6/1973 | Hamilton | 252/79.4 |
| 1,765,331 | 6/1930 | Gravell . | |
| 2,398,079 | 4/1946 | Janota et al. | 252/146 |
| 2,762,694 | 9/1956 | Newman | 41/43 |
| 2,942,956 | 6/1960 | Kelly | 252/142 |
| 3,119,726 | 1/1964 | King et al. | 252/79.4 |
| 3,162,547 | 12/1964 | Kendall | 134/41 |
| 3,410,803 | 11/1968 | Hoover | 252/79.2 |
| 3,634,262 | 1/1972 | Grunwald et al. | 252/100 |
| 3,635,826 | 1/1972 | Hamilton | 156/651 |
| 4,009,115 | 2/1977 | Binns | 252/142 |
| 4,014,715 | 3/1977 | Preston | 252/136 |
| 4,116,853 | 9/1978 | Binns | 252/142 |
| 4,124,407 | 11/1978 | Binns | 134/3 |
| 4,124,516 | 11/1978 | Skinozaki et al. | 252/79.2 |

FOREIGN PATENT DOCUMENTS

| | | |
|---|---|---|
| 954543 | 4/1964 | United Kingdom . |
| 1179486 | 1/1970 | United Kingdom . |
| 525746 | 8/1974 | U.S.S.R. . |
| 566866 | 8/1977 | U.S.S.R. . |
| 954543 | 4/1964 | United Kingdom . |
| 1179486 | 1/1970 | United Kingdom . |

*Primary Examiner*—John E. Kittle
*Assistant Examiner*—Hoa Van Le

[57] ABSTRACT

Aluminum foil, particularly for electrolytic capacitors, is degreased and deoxidized before processing by contacting the foil with a solution containing phosphoric acid and a nonionic surfactant. An agent corrosive to aluminum may be present. Contacting time is 20 to 240 seconds, and the temperature is 45° to 85° C. Preferably, 1.0–7.0 M phosphoric acid is used with 2 g/l of the nonionic surfactant and 1.0–3.0 g/l of corrosive agent.

8 Claims, No Drawings

DEGREASING AND DEOXIDIZING ALUMINUM FOIL

BACKGROUND OF THE INVENTION

This invention relates to the degreasing and deoxidizing of raw aluminum foil before processing the foil into electrolytic capacitors.

Raw foil as received has both rolling oil and oxide on its surface. Both must be removed before the foil is processed to make electrolytic capacitors. The first step in capacitor processing is an etching step, where the presence of oxide scale, in particular, on the foil surface leads to preferential etching that is undesirable. Presence of rolling oil on the foil in the etching step leads to a nonuniform etch.

Foils from different sources have different amounts of oil and oxide on their surfaces. They also react differently to deoxidizing reagents. Degreasing agents have been used to remove oils followed by a deoxidizing step.

Caustic has been used in the prior art to remove oxides, but with some foils caustic has caused preferential etching. Phosphoric acid has also been used to remove oxides, but results have not been uniform.

SUMMARY OF THE INVENTION

It has been found that rolling oils and oxides can be removed from raw aluminum foil to be used in electrolytic capacitors in one step without preferential etching by contacting the foil with an acidic solution of phosphoric acid and a nonionic surfactant. The surfactant is present to degrease the foil, and it was found to aid also in the deoxidizing. The phosphoric acid is present to deoxidize the foil without passivating the surface, as that would produce nonuniform etching leading to poor mechanical strength. An agent that is corrosive to aluminum is preferably present to catalyze the reaction and decrease the treating time.

The presence of corrosive agents in the solution also increases the etch site attack density. When there are few etch sites, those are preferentially etched to a greater depth than desirable, thus producing a mechanically weaker foil. When there are many etch sites, all are attacked, and the etch depth is reduced, producing a mechanically stronger foil.

Since raw foils differ in the amount of rolling oil and oxide on their surface, the contacting time and temperature and solution concentration differ also. Generally, the range of useful conditions is 45° to 85° C., 1.0 to 7.0 moles/liter phosphoric acid, and 20 to 240 seconds. The amount of surfactant used depends on the amount of rolling oil present, but generally 2 g/l has proved sufficient. A nonionic surfactant is preferred as it doesn't interact with the other materials. Particularly useful are the ethoxylated alkylphenol surfactants, such as members of the Tergitol series manufactured by Union Carbide Corp., the Igepal series manufactured by GAF Corp., and the Triton series manufactured by Rohm and Haas Co.

Phosphoric acid is preferred over its salts because of the higher reaction rate with the acid. The higher rate gives a practical and economic advantage of easier integration into the processing sequence, i.e., foil speed can be maintained relatively constant throughout a sequence of processing steps. Also it has been impossible to over pretreat with phosphoric acid in contrast to prior art caustic pretreatment. Thus, operating conditions may be varied widely.

As mentioned above, a corrosive agent catalyzes the reaction, decreasing treating time. It is particularly useful with stubborn foils that are heavily oxidized. Preferably, 1.0–3.0 g/l of corrosive agent is used, with 2.0 g/l generally preferred. Any chloride that does not form a precipitate in the bath, e.g., with phosphate, may be used.

DESCRIPTION OF THE PREFERRED EMBODIMENTS

Foil samples from different vendors were degreased and deoxidized by the process of this invention. Foil A was analyzed and found to have 0.67 $\mu g/cm^2$ of oil on the surface and 2.92 $\mu g/cm^2$ of oxide. The values for foil B were 0.58 $\mu g/cm^2$ and 0.84 $\mu g/cm^2$, respectively.

Because of the great difference in amount of oxide particularly and also of oil on the foil surfaces, different types of foils were treated under different conditions. Each type of foil was treated and then etched. The resulting etch structure was examined under a microscope. The desired structure is a gray surface showing an even distribution of etch pits all over the surface. Foil showing evidence of preferential etching—a localized etch in a line, spot, or area surrounded by unetched areas—is considered unsatisfactory and still "dirty".

Weight loss after pretreatment gives a measure of cleanliness, with the foil having the heavier oxide layer showing a greater weight loss, but the final analysis is the etch structure. Pretreatment is carried out at least until the etch structure is uniform.

EXAMPLE 1

Two different foils were treated to remove oxide and oil from the foil surfaces by contacting the foil with a 1.0 M phosphoric acid solution containing 2 g/l surfactant at 85° C. Table 1a gives the results for foil A having 2.92 $\mu g/cm^2$ oxide and 0.67 $\mu g/cm^2$ oil on its surface. Table 1b gives results for foil B having 0.84 $\mu g/cm^2$ oxide and 0.58 $\mu g/cm^2$ oil on its surface.

TABLE 1a

| Time, sec. | Wt. loss, $\mu g/cm^2$ | Etch structure |
| --- | --- | --- |
| 20 | 9.84 | Preferential |
| 40 | 17.52 | Preferential |
| 60 | 24.41 | Preferential |
| 80 | 30.91 | Preferential |
| 100 | 36.22 | Preferential |
| 120 | 42.32 | Preferential |
| 140 | 49.80 | Uniform |
| 160 | 51.57 | Uniform |
| 180 | 58.66 | Uniform |
| 200 | 61.81 | Uniform |

TABLE 1b

| Time, sec. | Wt. loss, $\mu g/cm^2$ | Etch structure |
| --- | --- | --- |
| 20 | 8.27 | Preferential |
| 40 | 12.80 | Uniform |
| 60 | 17.72 | Uniform |
| 80 | 21.65 | Uniform |
| 100 | 24.61 | Uniform |
| 120 | 28.54 | Uniform |

As the data show, at least 140 seconds treatment time is needed for the first foil corresponding to about 50 $\mu g/cm^2$ weight loss. By contrast, a minimum of 40 seconds was all that was needed with the second foil corresponding to about 13 $\mu g/cm^2$ weight loss.

EXAMPLE 2

The concentration of phosphoric acid was varied from 1.0 M to 7.0 M. It was found that 1.0 to 3.0 M concentration was sufficient for most foils with temperatures of 45° to 85° C. The amount of surfactant can be varied depending on the amount of oil and oxide to be removed from the foil surface; for most foils 2 g/l surfactant gave satisfactory results without foaming.

This example shows the reduction in treating time by the use of small amounts of corrosive agents at 85° C. In Table 2a, the corrosive agent was 0.6 M hydrochloric acid used with 1.0 M phosphoric acid, and 2 g/l Tergitol, a commercial nonionic surfactant. Treating times were varied; weight loss is in grams.

TABLE 2a

| Sample | Time, sec. | wt. loss, g | Etch Appearance |
|---|---|---|---|
| 1 | 10 | 0.0002 | Shiny, large etch pits |
| 2 | 20 | 0.0007 | Fairly uniform, some pits |
| 3 | 30 | 0.0003 | Very uniform |
| 4 | 40 | 0.0012 | Very uniform |
| 5 | 60 | 0.0015 | Uniform, but spots |
| 6 | 80 | 0.0020 | same as 60 sec |
| 7 | 100 | 0.0023 | same as 60 sec |
| 8 | 120 | 0.0026 | same as 60 sec |

Since a 30 second treatment time gave good results and can easily be integrated into existing processing schemes, all remaining experiments were carried out with 30 second immersion times.

In Table 2b and 2c, the corrosive agent is aluminum chloride. The concentrations of phosphoric acid and surfactant and treating temperature are the same as in Table 2a. Immersion time is 30 sec. Table 2b shows preliminary tests with aluminum chloride and Table 2c shows the results of more detailed test giving percent weight loss, 52 volt capacitance in $\mu F/in^2$, and appearance after etching.

TABLE 2b

| Aluminum, g/l chloride | Appearance after Etching |
|---|---|
| 0 | preferential etch |
| 0.2 | mixed areas of preferential and uniform etch |
| 0.4 | uniform |
| 0.6 | uniform; some shiny areas |
| 0.8 | some signs of preferential etch |
| 1.0 | uniform |

TABLE 2c

| Aluminum g/l chloride | % wt. loss | $\mu F/in^2$ | Appearance |
|---|---|---|---|
| 1.0 | 34.7 | 56.7 | Uniform |
| 2.0 | 33.3 | 56.9 | Uniform |
| 4.0 | 33.5 | 53.7 | Uniform |
| 6.0 | 34.6 | 57.2 | Uniform |
| 8.0 | 35.2 | 58.1 | Uniform |

In the next table, Table 2d, the use of sodium chloride as the corrosive agent was evaluated.

TABLE 2d

| NaCl, g/l | % wt. loss | $\mu F/in^2$ | Appearance |
|---|---|---|---|
| 0.25 | 34.9 | 44.5 | Shiny |
| 0.50 | 32.8 | 49.5 | Shiny |
| 0.75 | 33.5 | 45.7 | Some improvement |
| 1.00 | 33.5 | 43.6 | Uniform |
| 1.25 | 32.1 | 48.3 | Uniform |
| 1.50 | 34.1 | 46.3 | Uniform |

EXAMPLE 3

A series of experiments were carried out to determine process conditions for foil A of Example 1 as it had the highest surface oxide. Foils with less surface oxide do not need as much treatment but will not be harmed by the conditions needed for foil A.

The phosphoric acid concentration was varied from 1.0 to 3.0 M; 1 g/l sodium chloride and 2 g/l Tergitol were present. Immersion time and temperature needed to obtain weight losses of 30–35 $\mu g/cm^2$ for each phosphoric acid concentration are given below.

TABLE 3

| Temperature | Time, sec | | | | |
|---|---|---|---|---|---|
| | 1.0M | 1.5M | 2.0M | 2.5M | 3.0M |
| 65° C. | — | 100 | 70 | 62 | 52 |
| 75° C. | 52 | 42 | 35 | 31 | 22 |
| 85° C. | 30 | 22 | 18 | 13 | 12 |
| 95° C. | 17 | 14 | 10 | 9 | 7.5 |

From these data and other comparable data, the conditions that have been selected for full scale production runs are 1.0–2.0 M phosphoric acid depending on the oxide level on the foil, 2 g/l sodium chloride, 2 g/l Tergitol, 75±5° C., and 30–34 sec immersion time.

What is claimed is:

1. A process for degreasing and deoxidizing raw aluminum foil before processing for electrolytic capacitors comprises contacting said foil with a solution consisting essentially of 1.0 to 7.0 M phosphoric acid, an agent corrosive to aluminum, and a nonionic surfactant at a temperature of 45° to 85° C. for a contacting time of 20 to 240 seconds without preferential etching of said foil.

2. A process according to claim 1 wherein said agent is selected from the group consisting of hydrochloric acid, aluminum chloride, and sodium chloride.

3. A process according to claim 2 wherein the concentration of such agent is 0.1 to 10 g/l.

4. A process according to claim 3 wherein said concentration is 2 g/l.

5. A process according to claim 1 wherein the concentration of said phosphoric acid is 1.0–2.0 M.

6. A process according to claim 1 wherein said contacting is carried out at a temperature of 75±5° C.

7. A process according to claim 1 wherein said contacting is carried out for 30 to 35 seconds.

8. A process according to claim 1 wherein said nonionic surfactant is an ethoxylated alkylphenol and 2 g/l of said surfactant is used.

* * * * *